United States Patent
Kinugasa et al.

(10) Patent No.: US 11,639,768 B2
(45) Date of Patent: May 2, 2023

(54) CHARGED PARTICLE TRANSPORT SYSTEM AND INSTALLATION METHOD THEREFOR

(71) Applicants: TOSHIBA ENERGY SYSTEMS & SOLUTIONS CORPORATION, Kawasaki (JP); TOSHIBA PLANT SYSTEMS & SERVICES CORPORATION, Kawasaki (JP)

(72) Inventors: Kunihiko Kinugasa, Yokohama (JP); Hiromasa Itoh, Gyoda (JP); Yujiro Tajima, Yokohama (JP); Tomoyuki Nonaka, Yokohama (JP)

(73) Assignees: TOSHIBA ENERGY SYSTEMS & SOLUTIONS CORPORATION, Kawasaki (JP); TOSHIBA PLANT SYSTEMS & SERVICES CORPORATION, Kawasaki (JP)

(*) Notice: Subject to any disclaimer, the term of this patent is extended or adjusted under 35 U.S.C. 154(b) by 13 days.

(21) Appl. No.: 17/188,313

(22) Filed: Mar. 1, 2021

(65) Prior Publication Data
US 2021/0180746 A1  Jun. 17, 2021

Related U.S. Application Data

(63) Continuation of application No. PCT/JP2019/042006, filed on Oct. 25, 2019.

(30) Foreign Application Priority Data

Oct. 31, 2018 (JP) .............................. JP2018-204687

(51) Int. Cl.
*H05H 7/10* (2006.01)
*H05H 13/04* (2006.01)
(Continued)

(52) U.S. Cl.
CPC ......... *F16M 11/2021* (2013.01); *F16M 11/24* (2013.01); *H05H 7/10* (2013.01); *H05H 13/04* (2013.01)

(58) Field of Classification Search
USPC ............... 248/346.01, 346.03, 346.05, 346.5
See application file for complete search history.

(56) References Cited

U.S. PATENT DOCUMENTS 7,522,026 B2  4/2009  Kitahara et al.
2005/0068740 A1*  3/2005  Ulen .................. H01L 23/4006
257/E23.087

(Continued)

FOREIGN PATENT DOCUMENTS

JP  63-213329 A  9/1988
JP  7-85999 A  3/1995
(Continued)

OTHER PUBLICATIONS

International Search Report dated Jan. 7, 2020 in PCT/JP2019/042006 filed Oct. 25, 2019, 2 pages.

*Primary Examiner* — Alfred J Wujciak
(74) *Attorney, Agent, or Firm* — Oblon, McClelland, Maier & Neustadt, L.L.P.

(57) ABSTRACT

A charged particle transport system and its installation method, both of which can readily and quickly adjust alignment, are provided.
The charged particle transport system 10a includes: a frame 16 fixed to a base 15; a first plate 21 joined to an upper portion of the frame 16 with a height-adjustable first screw 11; a second plate 22 movably accommodated in a horizontal surface of the first plate; a second screw 12 screwed into a screw hole formed in a fixing member 25 around the first plate 21 such that its tip abuts on an outer peripheral surface of the second plate 22; a third screw 13 that fixes the second plate 21 to the first plate 21; and first engagement pins 31

(Continued)

inserted into respective engagement holes 17*a*, 17*b* formed in the second plate 22 and a supporting member 27 for engaging both.

6 Claims, 6 Drawing Sheets

(51) Int. Cl.
  *F16M 11/20*  (2006.01)
  *F16M 11/24*  (2006.01)

(56) References Cited

U.S. PATENT DOCUMENTS

| | | | |
|---|---|---|---|
| 2005/0109131 A1* | 5/2005 | Wanek | G11B 25/043 |
| 2007/0273464 A1 | 11/2007 | Kitahara et al. | |
| 2008/0011912 A1* | 1/2008 | Liao | F16M 11/105 |
| | | | 248/346.06 |
| 2015/0348739 A1 | 12/2015 | Aoki et al. | |
| 2020/0106067 A1* | 4/2020 | Russell | H01M 50/35 |
| 2021/0067246 A1* | 3/2021 | Nykolak | H04B 10/1125 |

FOREIGN PATENT DOCUMENTS

| | | | |
|---|---|---|---|
| JP | 7-211499 A | 8/1995 |
| JP | 9-138299 A | 5/1997 |
| JP | 11-214198 A | 8/1999 |
| JP | 11-248890 A | 9/1999 |
| JP | 2003-18800 A | 7/2003 |
| JP | 2007-149405 A | 6/2007 |
| JP | 4457353 B2 | 4/2010 |
| JP | 4487313 B2 | 6/2010 |
| JP | 2017-33769 A | 2/2017 |
| RU | 2 621 290 C1 | 6/2017 |
| WO | WO 2014/141433 A1 | 9/2014 |

* cited by examiner

CHARGED PARTICLE TRANSPORT SYSTEM AND INSTALLATION METHOD THEREFOR

CROSS-REFERENCE TO RELATED APPLICATIONS

This application is a Continuation Application of No. PCT/JP2019/042006, filed on Oct. 25, 2019, and the PCT application is based upon and claims the benefit of priority from Japanese Patent Application No. 2018-204687, filed on Oct. 31, 2018, the entire contents of which are incorporated herein by reference.

TECHNICAL FIELD

Embodiments of the present invention relate to a charged particle transport system and an installation method therefor.

BACKGROUND

In an accelerator, in order to control the trajectory of charged particles, a plurality of constituent devices such as a bending electromagnet, a quadrupole electromagnet, and a screen monitor are installed along this trajectory. These constituent devices are required to be installed with high accuracy with respect to the trajectory of the charged particles. Thus, when these constituent devices are installed, alignment adjustment is performed to position them with reference to the fixed point of the building. Various methods have been conventionally proposed for the alignment adjustment of these constituent devices.

For example, there is a known document that disclose the following technique. An electromagnet configured as a heavy object is installed on a frame fixed to a base via an alignment block that is adjustable in the horizontal and height directions. Here, the electromagnet and the alignment block have a specification of being positioned with high accuracy by guide pins. The alignment is adjusted by finely moving the alignment block in the horizontal direction and in the height direction.

PRIOR ART DOCUMENT

Patent Document

[Patent Document 1] JP S63-213329 A

SUMMARY

Problems to be Solved by Invention

It is emphasized as an excellent point that the alignment work in the above-described known document can be performed by the alignment block alone before installing the heavy electromagnet and the like. Consequently, even if repetition of the alignment work is unavoidable, the work load is reduced because the work procedure is such that the electromagnet and the like are installed after the alignment adjustment is completed.

However, in order to ensure the effectiveness of such an alignment adjustment method, it is a prerequisite that the alignment block is lightweight and has high rigidity. Further, it is required that the alignment can be readily readjusted even after the electromagnet is installed. However, the alignment block disclosed in the above-described known document is a heavy object having a complicated structure, which makes it difficult to readily complete the alignment work of the charged particle transport system in a short time.

In view of the above-described circumstances, embodiments of the present invention aim to provide a charged particle transport system and an installation method therefor, both of which can readily adjust the alignment in a short time.

Solution to Problem

A charged particle transport system includes: a frame to be fixed to a base; a first plate that is joined to an upper portion of the frame with a height-adjustable first screw; a second plate that is movably accommodated in a horizontal surface of the first plate; a second screw to be screwed into a screw hole formed in a fixing member located around the first plate in such a manner that a tip of the second screw abuts on an outer peripheral surface of the second plate; a third screw that fixes the second plate to the first plate; and first engagement pins that are inserted into engagement holes formed in each of the second plate and a support member to engage the second plate with the support member, the support member being configured to support a device through which charged particles pass.

Effects of Invention

Embodiments of the present invention provide a charged particle transport system and an installation method therefor, both of which can readily adjust the alignment in a short time.

DETAILED DESCRIPTION

First Embodiment

Figure 1A:
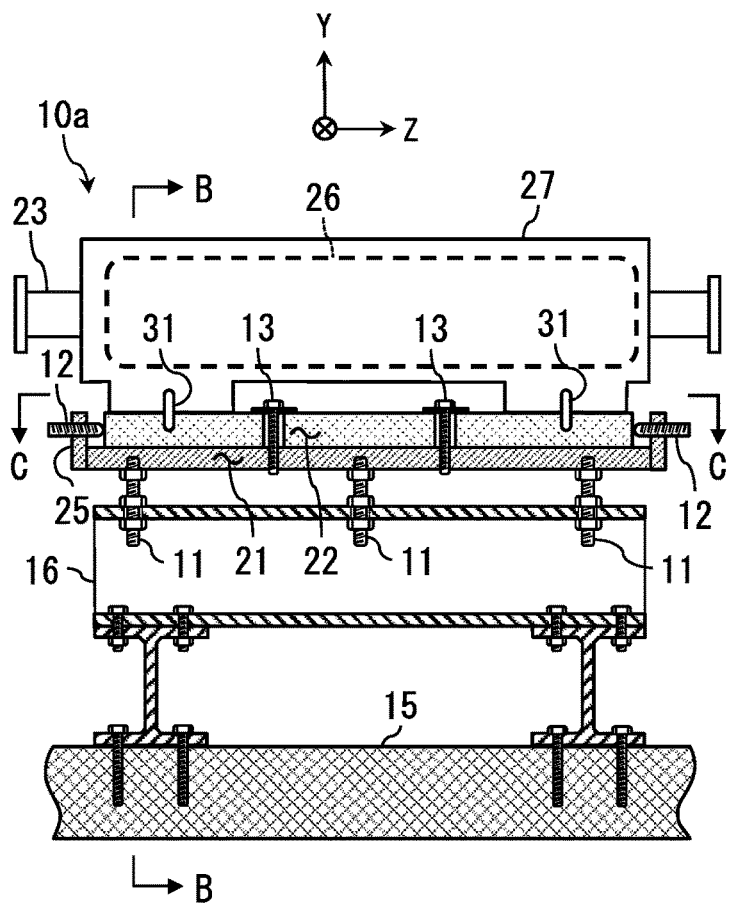
FIG. 1A is a Y-Z cross-sectional view illustrating a charged particle transport system according to the first embodiment of the present invention.

Hereinafter, embodiments of the present invention will be described by referring to the accompanying drawings. FIG. 1A is a Y-Z cross-sectional view illustrating a charged particle transport system 10*a* according to the first embodiment, FIG. 1B is an X-Y cross-sectional view illustrating the B-B cross-section of FIG. 1A, and FIG. 1C is an X-Z cross-sectional view illustrating the C-C cross-section of FIG. 1A.

Figure 1B:
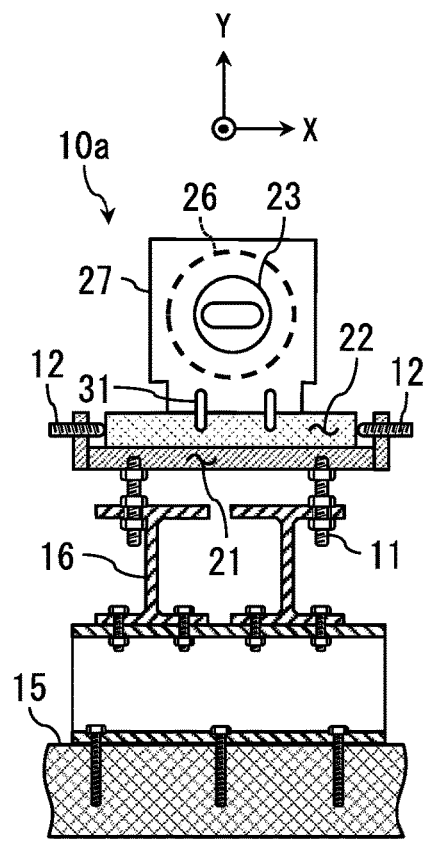
FIG. 1B is an X-Y cross-sectional view illustrating the B-B cross-section of FIG. 1A.
Figure 1C:
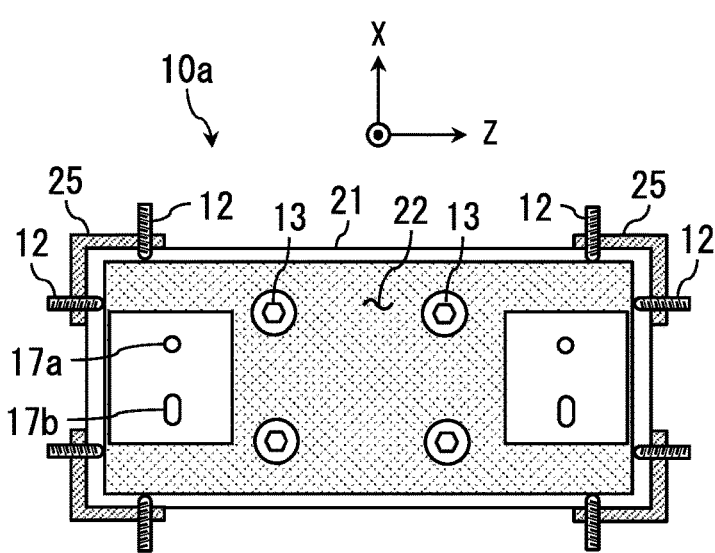
FIG. 1C is an X-Z cross-sectional view illustrating the C-C cross-section of FIG. 1A.

As shown in FIG. 1A, FIG. 1B, and FIG. 1C, the charged particle transport system 10*a* includes: a frame 16 to be fixed to a base 15; first plates 21 that are joined to the upper portion of the frame 16 with height-adjustable first screws 11; a second plate 22 that is movably accommodated in the horizontal surfaces of the first plates 21; second screws 12 to be screwed into respective screw holes formed in fixing members 25 located around the first plates 21 in such a manner that the tip of each second screw 12 abuts on the outer peripheral surface of the second plate 22; third screws 13 that fix the second plate 22 to the first plates 21; and first engagement pins 31 that are inserted into engagement holes 17 (17*a*, 17*b*) formed in each of the second plate 22 and a support member 27 so as to engage the second plate 22 with the support member 27. The support member 27 supports each device 26, through which charged particles pass.

The base 15 has functions of transmitting the load of the charged particle transport system 10*a* to the ground and safely supporting the charged particle transport system 10*a* and is constructed by concrete placement. The frame 16 is a structure for installing the charged particle transport system 10*a*, which is a heavy apparatus, with respect to the base 15. As illustrated in the figure, in the frame 16, H-shaped steels are stacked in the directions orthogonal to each other so as to be bolted together, and the lower portion is fixed to the base 15 with bolts.

However, the frame 16 is not limited to such a configuration and can take various forms. Additionally, a configuration in which the frame 16 and the base 15 are visually indistinguishable may be adopted by structurally forming the frame 16 such that the upper portion of the frame is at the same height level as the base 15.

Each first plate 21 has a flat surface on the upper side, and the second plate 22 is movably accommodated in the flat surface. The first plates 21 are joined to the upper portion of the frame 16 with the height-adjustable first screws 11. Further, the second screws 12 are screwed into the fixing members 25 located around the first plates 21. On the upper surface of the second plate 22, the engagement holes 17 (17*a*, 17*b*) into which the first engagement pins 31 are inserted are provided.

Figure 1D:
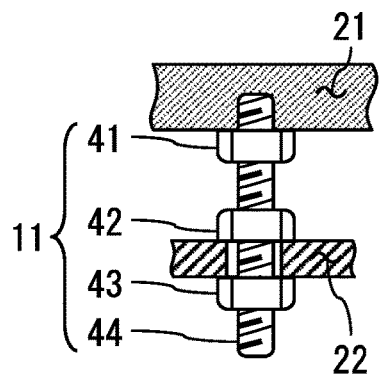
FIG. 1D is a cross-sectional view of each first screw.

As shown in FIG. 1D, in each first screw 11, one end of an axial bolt 44 having no head is screwed into the lower surface of the first plate 21 and is fixed with a first nut 41. Further, a second nut 42 for adjusting the height of the axial bolt 44 in the Y direction is screwed in. In this state, the other end of the axial bolt 44 is inserted into the hole of the second plate 22 and the third nut 43 is screwed in so as to fix the other end of the axial bolt 44. In this manner, the inclination adjustment and the height adjustment of the first plates 21 in the Y direction are performed by adjusting the plurality of first screws 11. When readjustment is performed, the third nut 43 is left loose and only the second nut 42 is rotated.

The second screws 12 are screwed into the screw holes formed in the fixing members 25 located around the first plates 21. Although FIG. 1C illustrates a case where the fixing members 25 are provided at the respective four corners of each first plate 21, it is not limited to such a configuration and the fixing members 25 may be provided at any positions. These second screws 12 are screwed into the fixing members 25 in such a manner that the tip of each second screw 12 is brought into contact with the outer peripheral surface of the second plate 22, and thereby, the position of the second plate 22 in the X direction and the position of the second plate 22 in the Z direction in the figure are adjusted independently. As a result, the second plate 22 moves relative to the first plates 21 in the X-Z plane.

Since the first screws 11 and the second screws 12 are adjusted in this manner, the alignment work can be performed before and after the installation of the support member 27 of the devices 26. After completing the alignment work, the third nut 43 of each first screw 11 is retightened and the third screws 13 are inserted so as to fix the second plate 22 to the first plates 21.

The devices 26 through which charged particles pass include a bending electromagnet, a quadrupole electromagnet, and a screen monitor. However, the devices 26 are not limited to these components. These devices 26 are integrally assembled together with the support member 27 such that a vacuum duct 23 for making charged particles pass through its inside penetrates the center of the trajectory. The assembly of the devices 26, the vacuum duct 23, and the support member 27 is performed at a location different from the installation location of the charged particle transport system 10*a*. After being integrally assembled, the charged particle transport system 10*a* is transported to the installation location.

As shown in FIG. 1C, each of the support member 27 and the second plate 22 is provided with the engagement holes 17 (17*a*, 17*b*), opening centers of which coincide with each other when they are overlayed. The first engagement pins 31 are inserted into these engagement holes 17 (17*a*, 17*b*), and thereby, the support member 27 for the devices 26 is engaged with the second plate 22.

Each first engagement pin 31 has a circular cross-section. The engagement holes 17 provided in either the support member 27 or the second plate 22 are composed of one having a circular cross-section (reference sign 17*a*) and one having an elliptic cross section (reference sign 17*b*). Although it is not shown in the figure, each engagement hole to be engaged with each first engagement pin 31 through each engagement hole 17*b* having an elliptical cross-section has a circular cross-section. The cross-sections of all the engagement holes 17 are not limited to the above-described shape, and all the engagement holes 17 may have the same cross-section as the first engagement pins 31.

This constrains the bidirectional movement of the second plate 22 at the positions of the engagement holes 17*a* having the circular cross-section. One-way movement of the second plate 22 is constrained at the positions of engagement holes 17*b* that have the elliptic cross-section and are located away from engagement holes 17*a*. As a result, the support member 27 for the heavy devices 26 can be lifted, moved onto the second plate 22, and placed easily. Further, the support member 27, which is disposed on the second plate 22 and is for supporting the devices 26, is positioned with high accuracy with respect to the second plate 22.

The installation method for the charged particle transport system according to the first embodiment will be described by referring to FIG. 2A, FIG. 2B, FIG. 3A, and FIG. 3B.

Figure 2A:
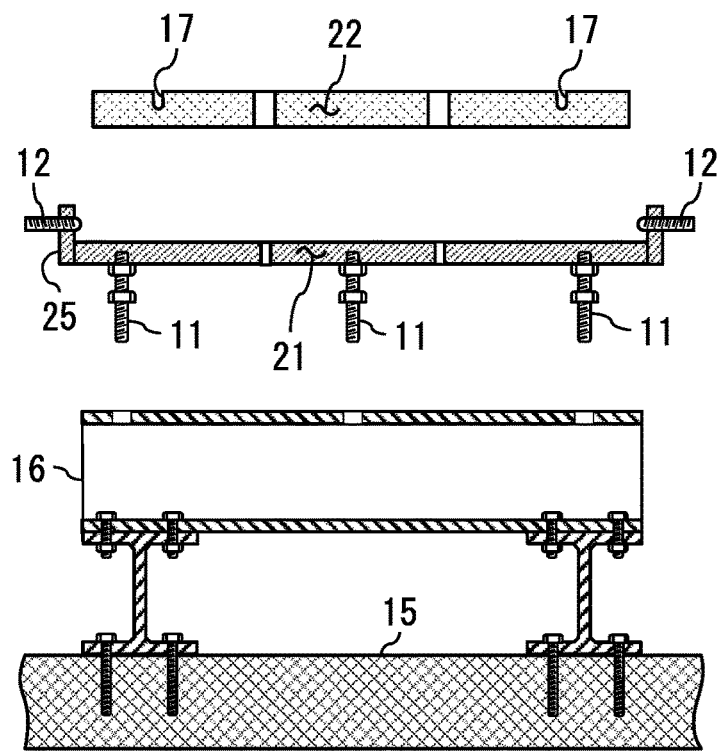
FIG. 2A and FIG. 2B are schematic diagrams illustrating an installation method for a charged particle transport system according to the first embodiment.

As shown in FIG. 2A, in the installation of the charged particle transport system, the frame 16 is fixed to the base 15, and then, the first plates 21 are joined to the upper portion of this frame 16 with the first screws 11. At this stage, the third nut 43 of each first screw 11 (FIG. 1D) is in an unfastened state. Further, the second plate 22 is movably accommodated on the upper surfaces of the first plates 21, and then, the second screws 12 are screwed into the screw holes of the fixing members 25 in such a manner that the tip of each second screw 12 abuts on the outer peripheral surface of the second plate 22.

Figure 2B:
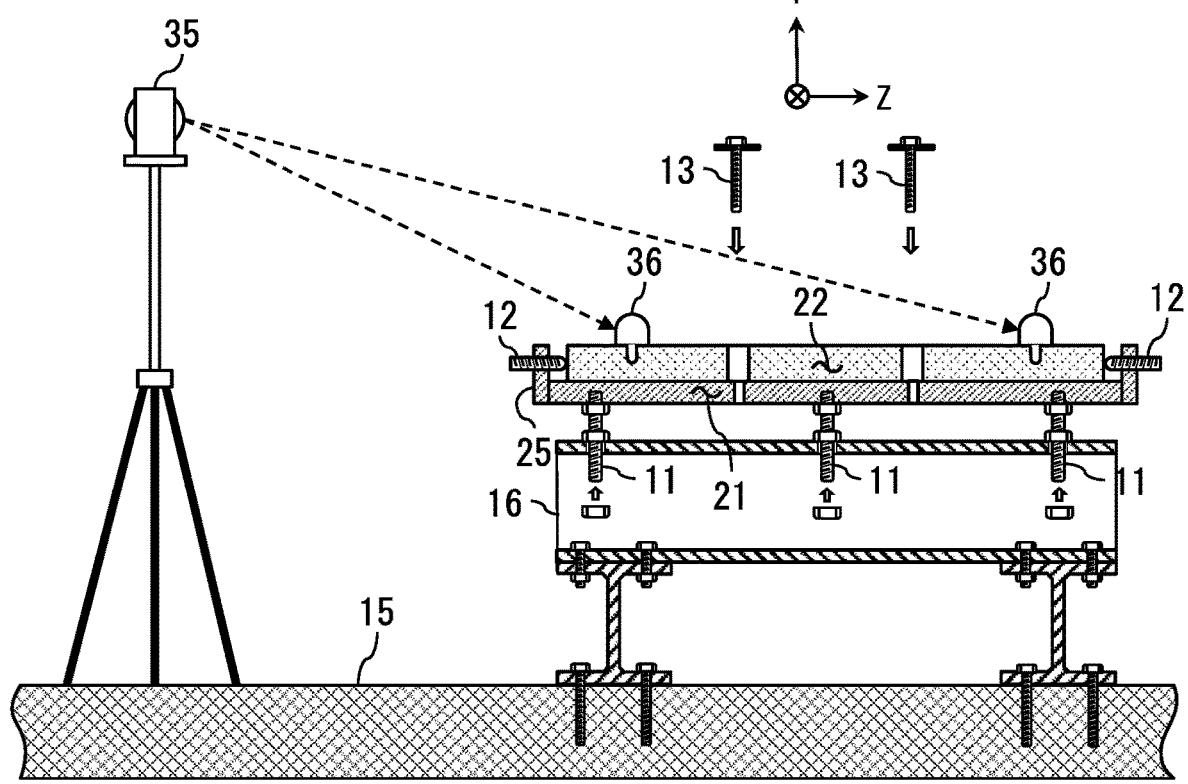

Next, as shown in FIG. 2B, an optical-position adjustment device 35 is installed at a fixed reference point on the base 15, and light beams to be outputted from this optical-position adjustment device 35 are radiated toward reference positions 36 on the second plate 22. In addition to the case where a light receiving device is installed at each reference position 36, there is also a case where a reference line is directly marked as the reference positions 36 on the second plate 22.

Under the state where the light beams are being outputted from the optical-position adjustment device 35, the height in the Y direction and inclination alignment are adjusted by the first screws 11 and the alignment of the X-Z horizontal plane is adjusted by the second screws 12. When the alignment adjustment in all the directions is completed, the third screws 13 are inserted so as to fix the second plate 22 to the first plates 21.

As described above, in the embodiment, the alignment adjustment can be directly performed on the first plates 21 and the second plate 22. Thus, the light beams outputted from the optical-position adjustment device 35 fixed at one place are radiated without being disturbed onto the plurality of first plates 21 arranged side by side along the trajectory of the charged particles. As a result, the movement of the optical-position adjustment device 35 can be reduced in the alignment work.

Figure 3A:
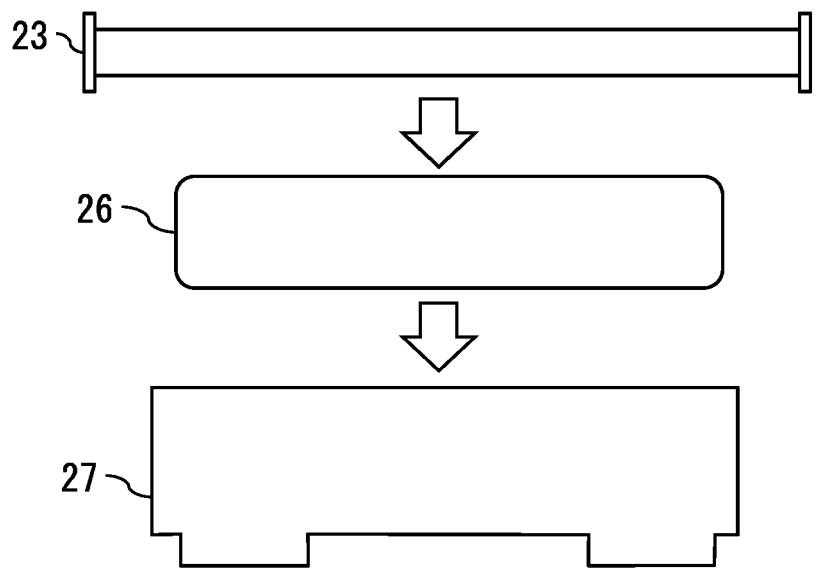
FIG. 3A and FIG. 3B are schematic diagrams illustrating the installation method for the charged particle transport system according to the first embodiment.

Although the temporal order may change, as shown in FIG. 3A, the devices 26, the vacuum duct 23, and the support member 27 are assembled at a location different from the installation location of the charged particle transport system and the charged particle transport system is transported to the installation location after being assembled integrally.

Figure 3B:
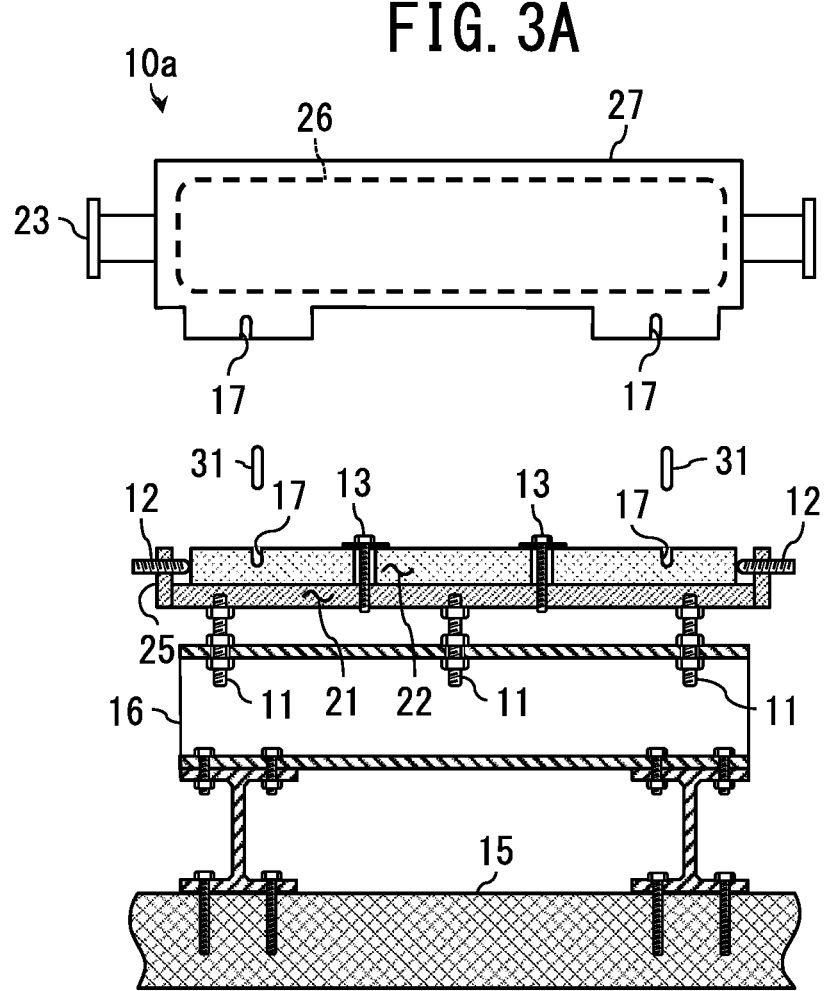

Afterward, as shown in FIG. 3B, the first engagement pins 31 are inserted into the engagement holes 17 provided in the support member 27 for the devices 26 and the second plate 22 so as to engage the second plate 22 with the support member 27. Further, the support member 27 and the second plate 22 are fixed with bolts (not shown) so as not to move, and thereby, the installation work is completed. Even after installing the support member 27 for the devices 26 on the plates 21 and 22, the alignment work can be performed by loosening the third screws 13 and the third nuts 43 and readjusting the first screws 11 and the second screws 12.

Second Embodiment

Figure 4A:
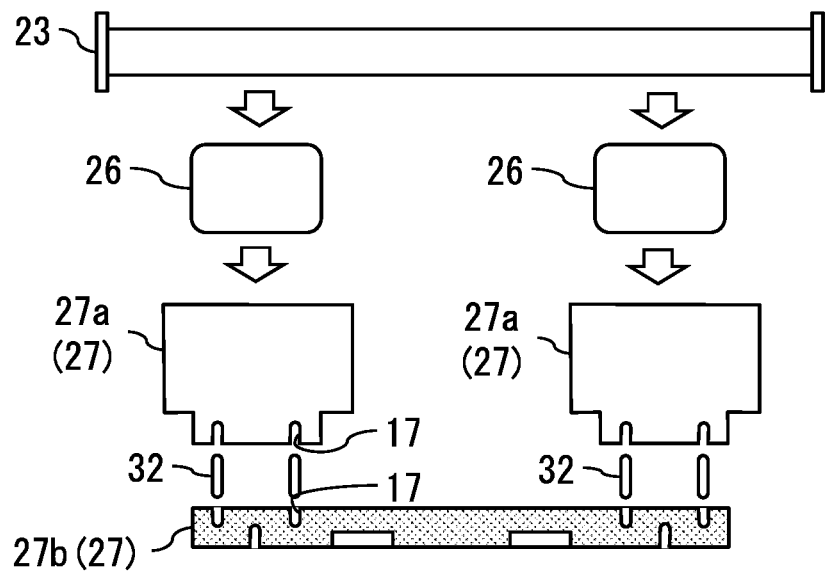
FIG. 4A, FIG. 4B, and FIG. 4C are cross-sectional views illustrating a charged particle transport system according to the second embodiment.
Figure 4B:
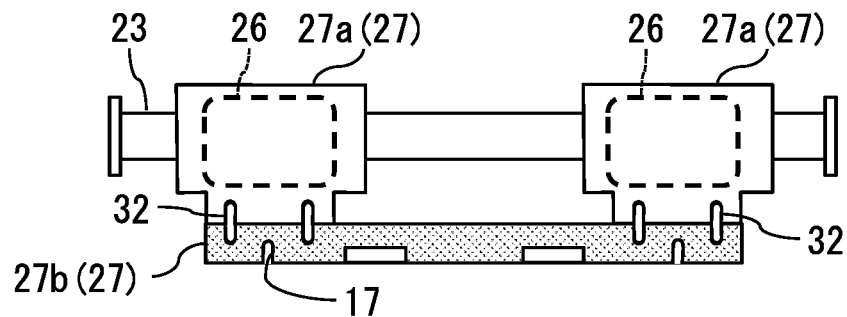
Figure 4C:
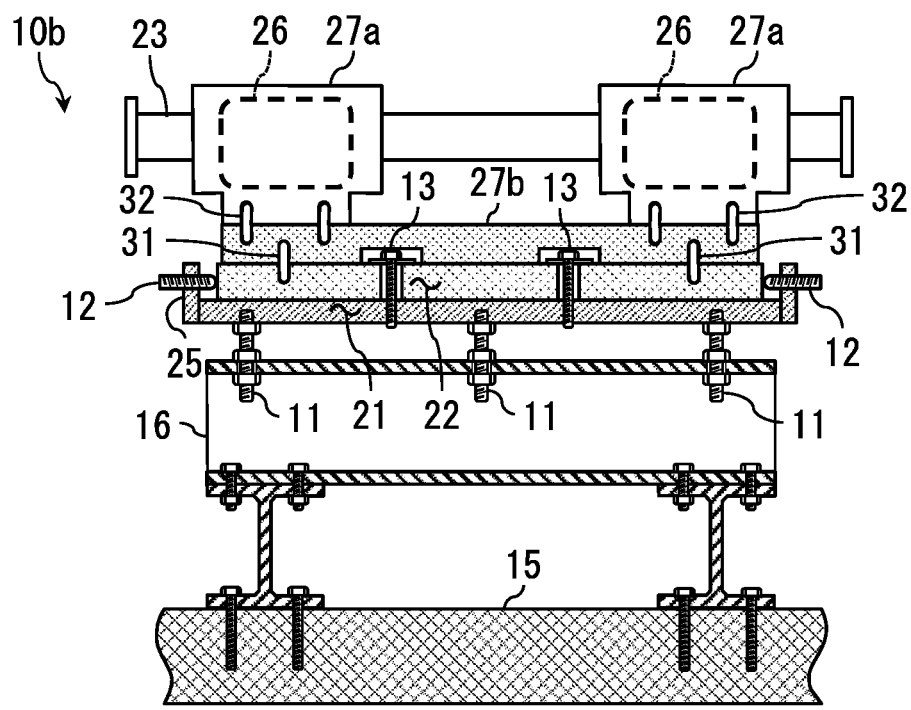

FIG. 4A, FIG. 4B, and FIG. 4C are cross-sectional views illustrating a charged particle transport system 10b according to the second embodiment. In FIG. 4A to FIG. 4C, components having the same configuration or function as those in FIG. 1A to FIG. 3B are denoted by the same reference signs, and duplicate description is omitted.

In the charged particle transport system 10b of the second embodiment, the support members 27 (27a, 27b) are composed of a plurality of first support members 27a, which support the respective devices 26 aligned in the horizontal direction, and a second support member 27b configured to support these first support members 27a. Further, the charged particle transport system 10b includes second engagement pins 32 that are inserted into the engagement holes 17 provided in each of the first support members 27a and the second support member 27b so as to engage the first support members 27a with the second support member 27b.

Since it is configured as described above, as shown in FIG. 4A, the assembly of each of the plurality of devices 26, each of the plurality of first support members 27a, and the second support member 27b can be performed at a location different from the location where the charged particle transport system is installed. As shown in FIG. 4B, it can be transported after being integrally assembled, and as shown in FIG. 4C, it is installed on the second plate 22 at the installation location.

Third Embodiment

Figure 5A:
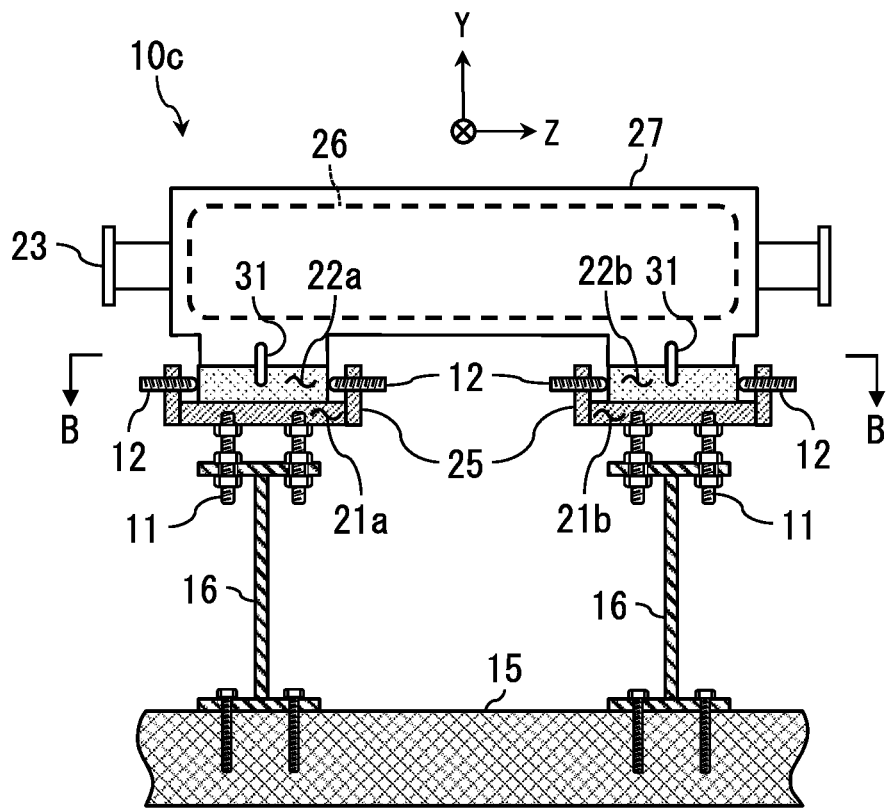
FIG. 5A is a Y-Z cross-sectional view illustrating a charged particle transport system according to the third embodiment.
Figure 5B:
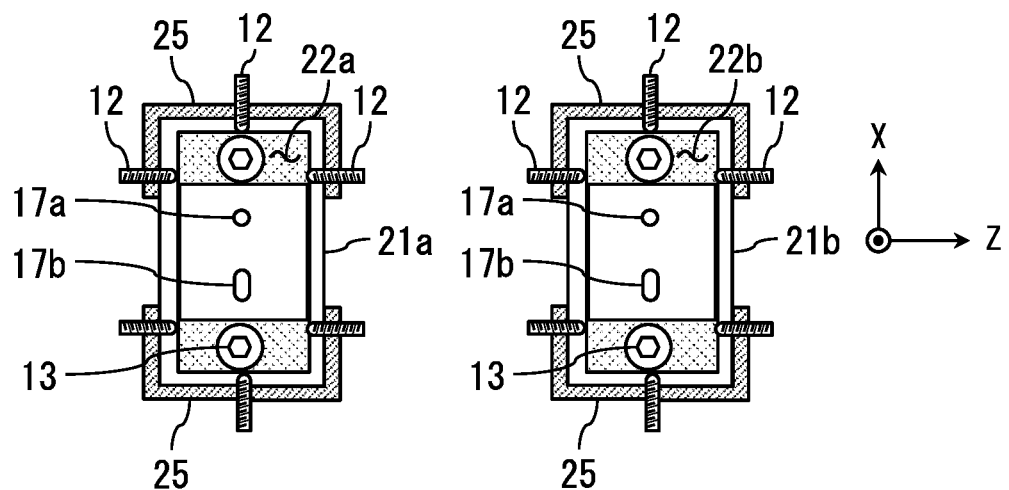
FIG. 5B is an X-Z cross-sectional view illustrating the B-B cross-section of FIG. 5A.

Next, the third embodiment of the present invention will be described by referring to FIG. 5A and FIG. 5B. FIG. 5A is a Y-Z cross-sectional view illustrating a charged particle transport system 10c according to the third embodiment and FIG. 5B is an X-Z cross-sectional view illustrating the B-B cross-section of FIG. 5A. In FIG. 5A and FIG. 5B, components having the same configuration or function as those in FIG. 1A to FIG. 4C are denoted by the same reference signs, and duplicate description is omitted.

In the charged particle transport system 10c of the third embodiment, the support member 27 is engaged, via the first engagement pins 31, with each of second plates 22a and 22b configured as a plurality of divided parts. The divided second plates 22a and 22b are accommodated in the similarly divided first plates 21a and 21b, respectively. The divided first plates 21a and 21b and the divided second plates 22a and 22b can be adjusted independently by the first and second screws 11 and 12 that are provided for each of them.

Figure 6:
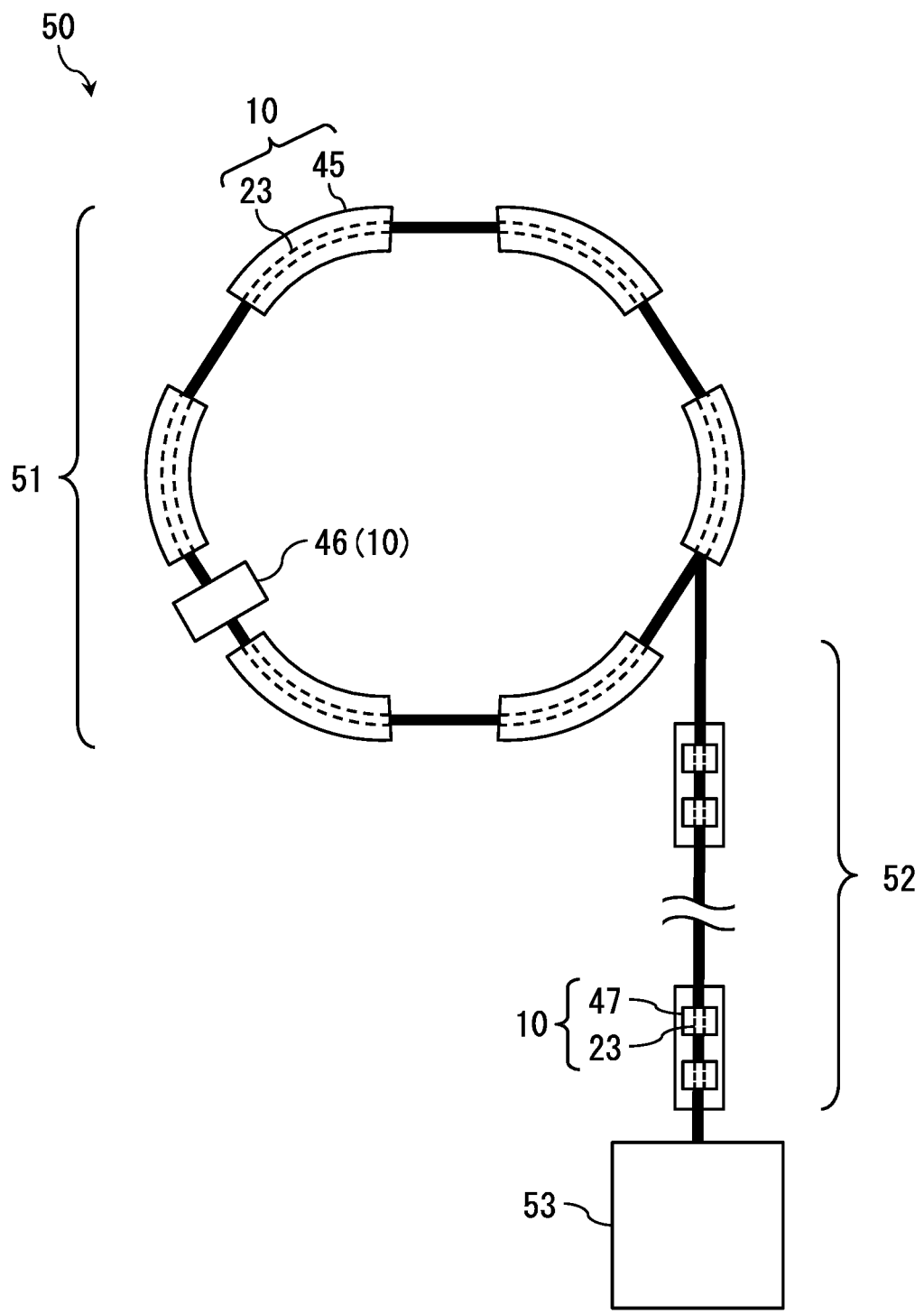
FIG. 6 is an overall view of a synchrotron to which the charged particle transport system according to each embodiment is applied.

FIG. 6 is an overall view of a synchrotron 50 to which the charged particle transport system 10 (10a, 10b, 10c) according to each embodiment is applied. The synchrotron 50 includes: a circular accelerator 51 that accelerates charged particles in a circular orbit; a transport line 52 that extracts the accelerated charged particles from the circular accelerator 51 and transports them; and an irradiation room 53 in which a target (not shown) is irradiated with the transported charged particles.

The circular accelerator 51 includes at least: an accelerating cavity 46 that accelerates the charged particles by the action of a high-frequency electric field; and a bending electromagnet 45 that puts the charged particles into the circular orbit by the action of a direct-current magnetic field.

The bending electromagnet 45, the accelerating cavity 46, the quadrupole electromagnet 47, the vacuum duct 23, and the other devices 26 (FIG. 1, FIG. 4) constitute the charged particle transport system 10 and are fixedly supported by the base 15 (FIG. 1, FIG. 4). Although a description has been given of the case where the charged particle transport system 10 is applied to the synchrotron 50 in the embodiment, it may be applied to only one of the circular accelerator 51 and the transport line 52.

According to the charged particle transport system of at least one embodiment described above, the device(s) is/are fixed via the engagement pins 31 to the second plate 22 for adjusting the position in the horizontal direction, the first plates 21 for adjusting the height direction and inclination are fixed to the frame 16, and thus, the alignment of the charged particle transport system can be readily adjusted in a short time.

While certain embodiments have been described, these embodiments have been presented by way of example only, and are not intended to limit the scope of the inventions. These embodiments may be embodied in a variety of other forms, and various omissions, substitutions, and changes may be made without departing from the spirit of the inventions. These embodiments and their modifications are included in the accompanying claims and their equivalents as well as included in the scope and gist of the inventions.

REFERENCE SIGNS LIST 10 (10a, 10b, 10c) charged particle transport system
11 first screw
12 second screw
13 third screw
15 base
16 frame
17 (17a, 17b) engagement hole
21 (21a, 21b) first plate
22 (22a, 22b) second plate
23 vacuum duct
25 fixing member
26 device
27 support member
27a first support member
27b second support member
31 first engagement pin
32 second engagement pin
35 optical-position adjustment device
36 reference position
41 first nut
42 second nut
43 third nut
44 axial bolt
45 bending electromagnet
46 accelerating cavity
47 quadrupole electromagnet
50 synchrotron
51 circular accelerator
52 transport line
53 irradiation room

The invention claimed is:

1. A charged particle transport system comprising:
a frame to be fixed to a base;
a first plate that is joined to an upper portion of the frame with a height-adjustable first screw;
a second plate that is movably accommodated in a horizontal surface of the first plate;
a second screw to be screwed into a screw hole formed in a fixing member located at a periphery of the first plate in such a manner that a tip of the second screw abuts on an outer peripheral surface of the second plate;
a third screw that fixes the second plate to the first plate;
a support member configured to support at least one transport device through which pass charged particles generated in a particle accelerator, the at least one transport device assembled together with the support member; and
first engagement pins that are inserted into engagement holes formed in each of the second plate and the support member to engage the second plate with the support member supporting the at least one transport device.

2. The charged particle transport system according to claim 1, further comprising a second engagement pin, wherein:
the at least one device comprises a plurality of devices;
the support member includes a plurality of first support members configured to support each of the plurality of devices aligned in a horizontal direction and a second support member configured to support the plurality of the first support members; and
the second engagement pin is configured to engage the first support members with the second support member by being inserted into engagement holes that are provided in each of the first support members and the second support member.

3. The charged particle transport system according to claim 1, wherein:
either or both of the second engagement pin and the plurality of first engagement pins has a circular cross-section; and
the engagement holes provided in either one of the support member and the second plate are composed of one having a circular cross-section and one having an elliptic cross-section.

4. The charged particle transport system according to claim 1, wherein:
each of the first plate and the second plate is composed of a plurality of divided parts;
the support member is configured to engage with each of the plurality of divided parts of the second plate via the first engagement pins;
each of the plurality of divided parts of the second plate is accommodated in each of the plurality of divided parts of the first plate; and
the first plate and the second plate can be adjusted independently by the first screw and the second screw that are provided for each of the first plate and the second plate.

5. The charged particle transport system according to claim 1, wherein the upper portion of the frame is formed in such a manner that a height level of the upper portion is equal to a height level of the base.

6. An installation method for a charged particle transport system comprising:
fixing a frame to a base;
joining a first plate to an upper portion of the frame with a height-adjustable first screw;
accommodating a second plate in a horizontal surface of the first plate in such a manner that the second plate is movable in the horizontal surface;
screwing a second screw into a screw hole formed in a fixing member located at a periphery of the first plate in such a manner that a tip of the second screw abuts on an outer peripheral surface of the second plate;
adjusting the first screw and the second screw in such a manner that a light beam to be outputted from an optical-position adjustment device is radiated onto a reference position on the second plate;
fixing the second plate to the first plate with a third screw; and
inserting first engagement pins into engagement holes formed in each of the second plate and a support member to engage the second plate with the support member, the support member being for supporting a transport device through which pass charged particles generated in a particle accelerator.

* * * * *